(12) United States Patent
Desjoyeaux et al.

(10) Patent No.: US 12,472,659 B2
(45) Date of Patent: Nov. 18, 2025

(54) METHOD FOR PRODUCING A PART MADE OF COMPOSITE MATERIAL

(71) Applicant: SAFRAN NACELLES, Gonfreville-l'Orcher (FR)

(72) Inventors: Bertrand Léon Marie Desjoyeaux, Moissy-Cramayel (FR); Davi Silva De Vasconcellos, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/836,098

(22) PCT Filed: Feb. 7, 2023

(86) PCT No.: PCT/FR2023/050158
§ 371 (c)(1),
(2) Date: Aug. 6, 2024

(87) PCT Pub. No.: WO2023/152441
PCT Pub. Date: Aug. 17, 2023

(65) Prior Publication Data
US 2025/0108535 A1    Apr. 3, 2025

(30) Foreign Application Priority Data
Feb. 10, 2022    (FR) .................................. 2201173

(51) Int. Cl.
*B28B 1/00*    (2006.01)
*B28B 1/26*    (2006.01)

(52) U.S. Cl.
CPC .................... *B28B 1/262* (2013.01)

(58) Field of Classification Search
CPC ...................................................... B28B 1/262
See application file for complete search history.

(56) References Cited

U.S. PATENT DOCUMENTS 5,620,489 A * 4/1997 Tselesin ............. B24D 18/0009
51/299
2017/0334791 A1* 11/2017 Podgorski ............. C04B 35/185
(Continued)

FOREIGN PATENT DOCUMENTS

CN    107207354 A    9/2017
CN    109195930 A    1/2019
(Continued)

OTHER PUBLICATIONS

Written Opinion of the International Searching Authority as issued in International Patent Application No. PCT/FR2023/050158, dated May 22, 2023.
(Continued)

*Primary Examiner* — Nicholas R Krasnow
(74) *Attorney, Agent, or Firm* — Pillsbury Winthrop Shaw Pittman LLP

(57) ABSTRACT

A method for producing a part made of composite material, includes obtaining a mold includes (i) a fibrous texture, (ii) a granular filtration layer located between a drainage surface of the texture and a permeable discharge surface and including a powder of filtration particles, and (iii) an element for retaining the granular layer, which element is distinct from the layer and located between the permeable discharge surface and the drainage surface, introducing a suspension including matrix particles in a liquid medium through an introduction surface of the fibrous texture that is distinct from the drainage surface, the liquid medium passing through the drainage surface, the granular filtration layer and the retention element to be discharged through the permeable discharge surface, and the matrix particles being retained in the pores of the fibrous texture by the granular filtration layer, and forming the part made of composite material by forming a matrix.

11 Claims, 3 Drawing Sheets

(56) References Cited

U.S. PATENT DOCUMENTS

2020/0339480 A1* 10/2020 Philippe .................... B28B 7/46
2021/0046671 A1*  2/2021 Philippe ................ C04B 35/447

FOREIGN PATENT DOCUMENTS

| CN | 111093922 A | 5/2020 | | |
|----|----|----|----|----|
| CN | 111542431 A | 8/2020 | | |
| DE | 10 2020 106043 A1 | 9/2021 | | |
| FR | 3 071 246 A1 | 3/2019 | | |
| WO | WO 2016/102839 A1 | 6/2016 | | |
| WO | WO-2019197757 A1 * | 10/2019 | ............. | B28B 1/261 |

OTHER PUBLICATIONS

International Search Report as issued in International Patent Application No. PCT/FR2023/050158, dated May 22, 2023.

* cited by examiner

[Fig. 1]
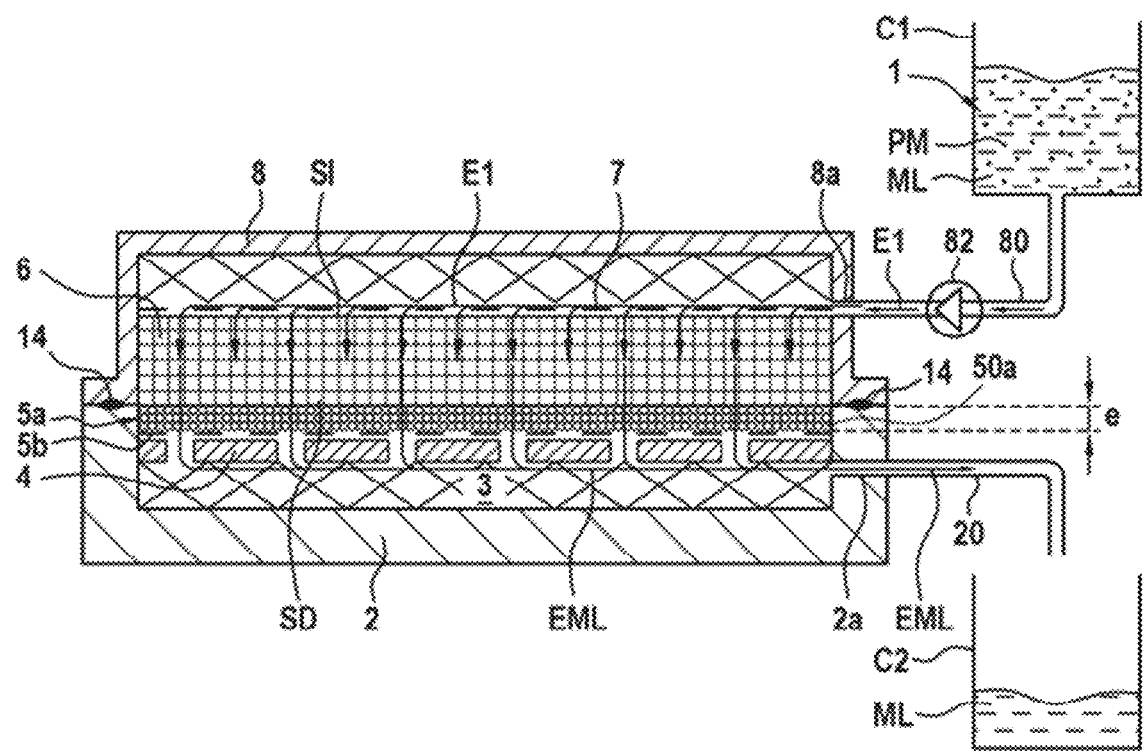
[Fig. 2]
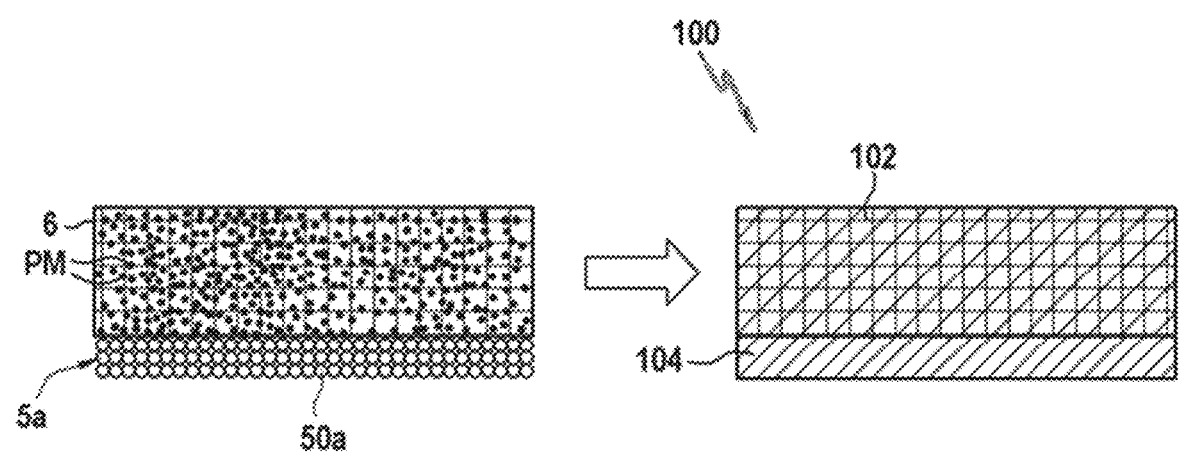

[Fig. 3]
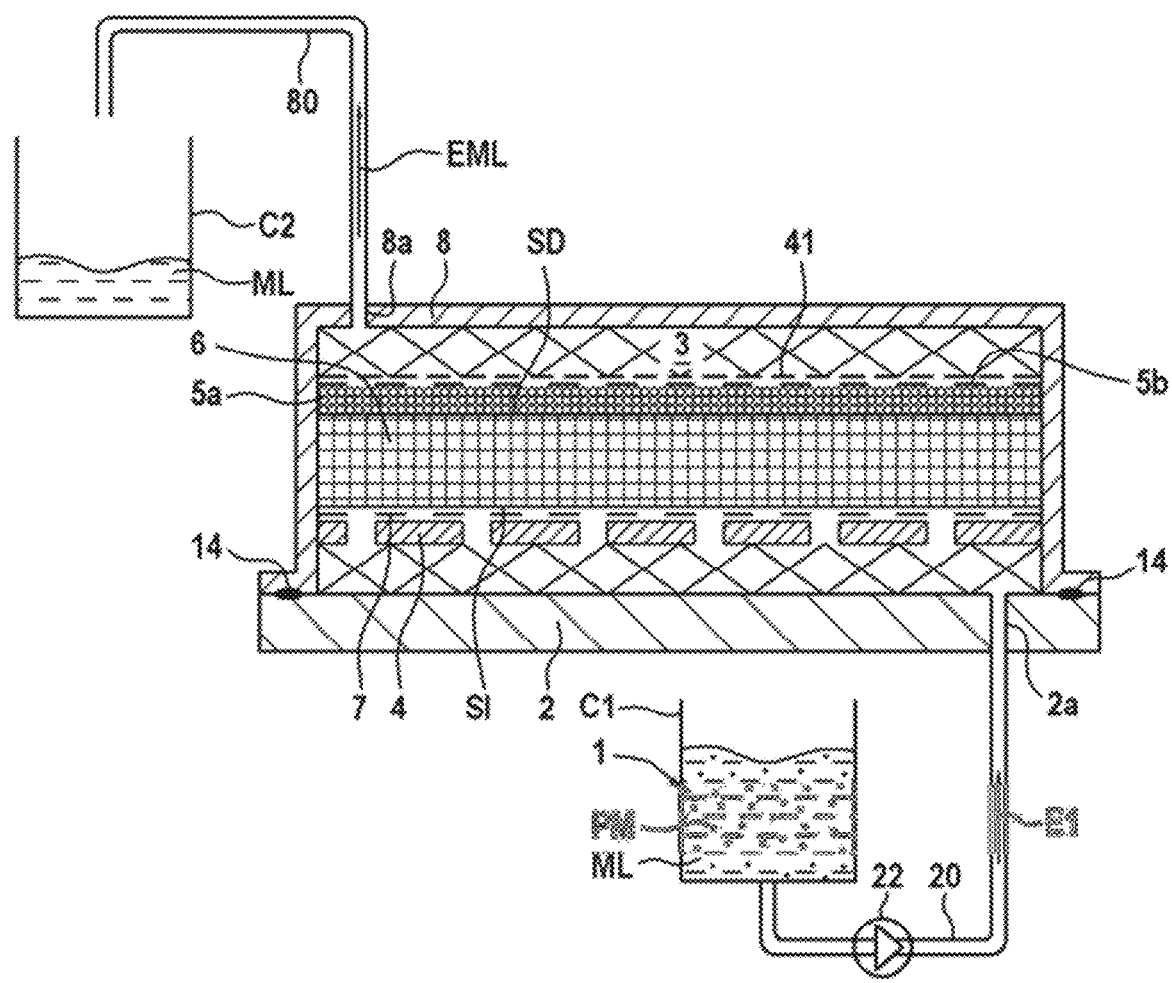
[Fig. 4]
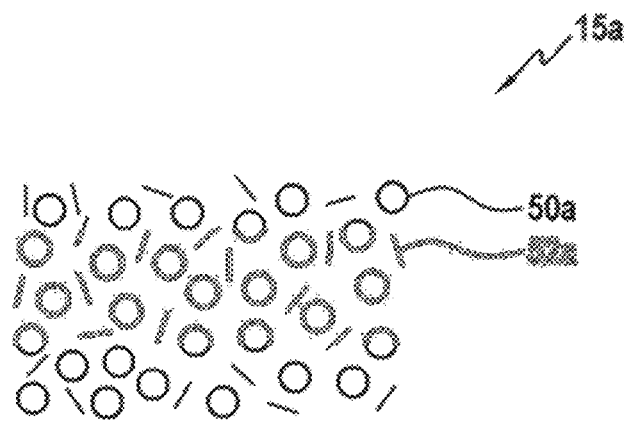

[Fig. 5]
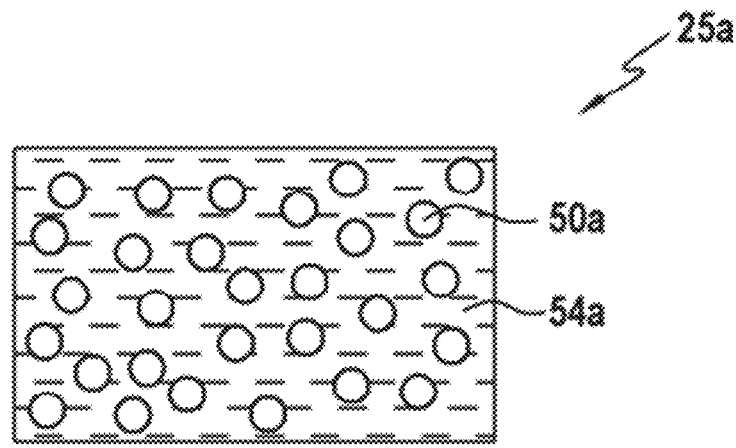
[Fig. 6A]
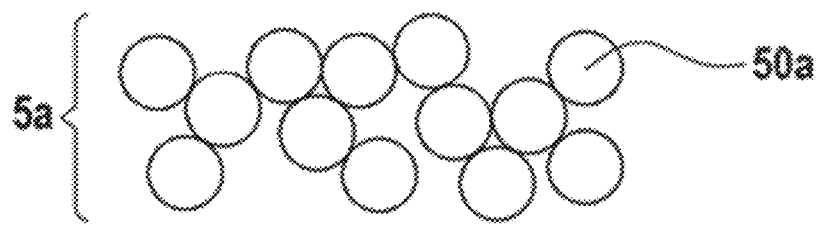
[Fig. 6B]
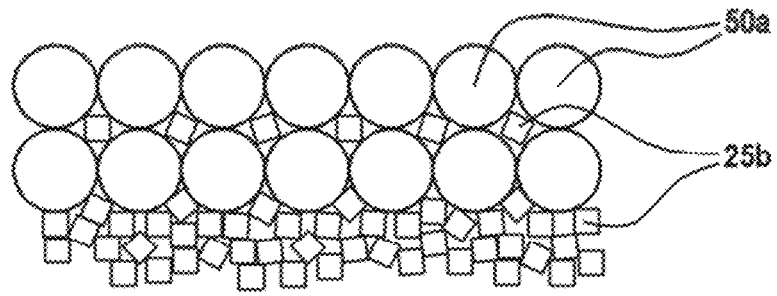

METHOD FOR PRODUCING A PART MADE OF COMPOSITE MATERIAL

CROSS-REFERENCE TO RELATED APPLICATIONS

This application is the U.S. National Stage of PCT/FR2023/050158, filed Feb. 7, 2023, which in turn claims priority to French patent application number 2201173 filed Feb. 10, 2022. The content of these applications are incorporated herein by reference in their entireties.

TECHNICAL FIELD

The invention relates to a method for producing a part made of composite material in which the material intended to form the matrix is provided by introducing a suspension into a reinforcing texture and the liquid medium of this suspension is discharged from the texture by drainage through a granular layer intended to be incorporated into the part obtained. The invention relates in particular to applications in the production of turbomachine parts, for example aeronautical turbomachine parts.

PRIOR ART

It is known to produce parts made of composite material by introducing a powder into the pores of a fibrous texture by infiltration of a suspension, for example using an STM ("Slurry Transfer Molding") method. In this case, the liquid medium of the suspension is drained or filtered while the powder intended to form the matrix of the part is retained in the pores of the texture. Such a method is described in particular in document WO 2016/102839 which proposes the implementation of a rigid part made of porous polytetrafluoroethylene (PTFE) material interposed between the fibrous texture and the molding surface through which the liquid medium of the suspension is discharged. The porous material part is then detached from the fibrous texture during its demolding after infiltration. However, the rigidity of the part made of porous material used gives it a limited capacity for adaptation to complex geometries and this technique has a relatively high implementation cost.

The invention proposes to overcome the disadvantages of the prior art.

Presentation of the Invention

The invention relates to a method for producing a part made of composite material, comprising at least:
  obtaining a mold comprising (i) a fibrous texture, (ii) a granular filtration layer located between a drainage surface of the texture and a permeable discharge surface and comprising a powder of filtration particles, and (iii) an element for retaining the granular layer, which element is distinct from said layer and located between the permeable discharge surface and the drainage surface,
  introducing a suspension comprising matrix particles in a liquid medium through an introduction surface of the fibrous texture that is distinct from the drainage surface, the liquid medium passing through the drainage surface, the granular filtration layer and the retention element to be discharged through the permeable discharge surface, and the matrix particles being retained in the pores of the fibrous texture by the granular filtration layer, and
  forming the part made of composite material by forming a matrix in the pores of the fibrous texture from the matrix particles and forming a surface layer of this part from the filtration particles.

The invention proposes the use of a granular filtration layer which is intended to be integrated into the composite material part obtained, which allows to avoid the step of removing the porous part encountered in the prior art and limitations in terms of accessible geometries related to the rigidity of this porous part. The retention element prevents the filtration particles from being carried outside the mold during the discharge of the liquid medium.

In an exemplary embodiment, the granular filtration layer further comprises reinforcing fibers distinct from the filtration particles.

Such a characteristic advantageously allows to improve the mechanical properties of the surface layer of the part obtained.

In an exemplary embodiment, the retention element comprises at least one film or textile having a plurality of orifices for discharging the liquid medium and located between the granular filtration layer and the permeable discharge surface.

In an exemplary embodiment, the retention element comprises at least one granular assembly formed by additional filtration particles having a different average size and/or a different shape of the filtration particles and interlocked therewith so as to prevent their movement towards the permeable discharge surface.

Unless otherwise stated, "average size" refers to the dimension given by the statistical particle size distribution to half of the population, known as D50.

In particular, the additional filtration particles may have an average size less than or equal to three times the average size of the filtration particles, for example less than or equal to the average size of the filtration particles.

The granular filtration layer can be positioned in the mold in different ways.

According to a first example, obtaining the mold comprises positioning the granular filtration layer in the form of a block comprising the filtration particles bound together by a fugitive binder.

According to another example, obtaining the mold comprises spraying the filtration particles onto the drainage surface of the fibrous texture and/or onto the permeable discharge surface.

According to one example, obtaining the mold comprises (a) the formation of the granular filtration layer comprising the filtration particles, and (b) the supply of additional filtration particles in a carrier liquid which is drained through the filtration particles and the drainage surface, the additional filtration particles being retained by the filtration particles so as to form the retention element.

In particular, the granular filtration layer can be formed by adding filtration particles to a second vector liquid on the side of the drainage surface, said filtration particles being able to have a particle size greater than a size of the interstices of the pore network of the fibrous texture, with drainage of the second carrier liquid through the drainage surface, the filtration particles being able to be retained by the fibrous texture so as to form the granular filtration layer.

In an exemplary embodiment, the matrix is formed by sintering the matrix particles, and the surface layer is formed by sintering the filtration particles.

The use of sintering advantageously allows to form the matrix and the surface layer with limited implementation cost.

In an exemplary embodiment, the matrix particles and the filtration particles are formed from the same material.

Such a characteristic advantageously allows to obtain optimal compatibility between the surface layer and the matrix of the part.

In an exemplary embodiment, the matrix particles and the filtration particles are made of oxide ceramic material, silicon carbide or carbon.

In an exemplary embodiment, the part is a turbomachine part, for example an aeronautical turbomachine part.

BRIEF DESCRIPTION OF THE DRAWINGS

FIG. 1 is a schematic sectional view showing the introduction of matrix particles into the pores of a texture as part of an example of a method according to the invention.

FIG. 2 schematically illustrates the obtaining of the part by heat treatment from the texture obtained according to the example of FIG. 1.

FIG. 3 is a schematic sectional view showing the introduction of matrix particles into the pores of a texture in the context of a variant method according to the invention.

FIG. 4 schematically and partially shows a granular filtration layer usable in the context of the invention.

FIG. 5 schematically and partially shows another granular filtration layer usable in the context of the invention.

FIG. 6A schematically and partially shows an example of a granular filtration layer usable in the context of the invention.

FIG. 6B schematically and partially shows an example of a retention element in the form of a granular assembly usable in the context of the invention and associated with the granular layer of FIG. 6A.

DESCRIPTION OF EMBODIMENTS

FIG. 1 shows a mold formed by joining an upper tool 8 and a lower tool 2 which comprises a molding surface 4, for example formed of a rigid material, which is intended to give its shape to the surface of the part to be obtained located opposite thereto. The molding surface 4 forms, in the example of FIG. 1, a permeable surface allowing the discharge of the liquid medium ML from the suspension 1 outside the mold. A fibrous texture 6 is present in the mold and has along one of its surfaces SD, called the drainage surface, a granular filtration layer 5a comprising a plurality of filtration particles 50a. The particles 50a can be in contact with the surface SD. A retention element, in the form of a porous layer 5b for retaining the particles 50a, is located between the layer 5a and the molding surface 4 and has sufficiently fine pores to retain the particles 50a in place against the texture 6 during the discharge of the liquid medium ML during the introduction of the suspension 1. The layers 5a and 5b can, as illustrated, substantially cover the entire surface SD. The particles 50a can be in contact with the layer 5b. The layer 5b can be in contact with the molding surface 4.

The particles 50a are formed of a material compatible with an integration into the composite material part. For example, these particles 50a can be made of alumina ($Al_2O_3$) if the part is an oxide/oxide composite, of silicon carbide (SiC) for a part with a silicon carbide matrix, or of carbon or graphite if a carbon matrix part is produced. In order to guarantee optimal compatibility, the particles 50a formed of the same material as the matrix particles PM can be used, but the person skilled in the art will recognize that variants are possible without departing from the scope of the invention. Generally speaking, the average size of the particles 50a can be greater than the average size of the matrix particles PM. The average size of the particles 50a can be comprised between 1 time and 50 times the average size of the matrix particles PM, in particular between 1 time and 30 times or between 1 time and 3 times the average size of the matrix particles PM. Generally speaking, the layer 5a can have a thickness e comprised between 5 times and 1000 times the average size of the matrix particles PM, in particular between 10 times and 500 times the average size of the matrix particles. For example, the thickness e of the layer 5a can be comprised between 4 μm and 200 μm.

The texture 6 is intended to form the reinforcement of the composite material part. The production of the texture 6 uses techniques known per se, such as the stacking of two-dimensional fabrics, three-dimensional weaving or else the placement of ribbons of unidirectional fibers. The wires used to form the texture 6 can be made of ceramic material, for example carbide or oxide, or of carbon. In particular, alumina wires can be used if an oxide/oxide composite part is produced.

The layer 5b allows to retain the particles 50a against the drainage surface SD of the texture 6. In the example illustrated in FIG. 1, the layer 5b is formed by a film comprising a plurality of through orifices or several of these films superimposed. The size of the orifices is chosen according to the size of the particles 50a to ensure their retention. As an illustration, the orifices may have an average size comprised between 10 μm and 100 μm and the film may have a surface opening rate (corresponding to the ratio of the total surface of the orifices/surface of the film) comprised between 0.1% and 2%. The layer 5b may be made of polymeric material. Alternatively, a layer 5b formed by a textile, for example a fabric, can be used. Generally speaking, the layer 5b can typically have a thickness less than or equal to 100 μm. In the case of FIG. 1, the particles 50a are not bound together and held in place due to their interposition between the texture 6 and the layer 5b. The layer 5a may be in the form of a granular bed, here comprising a plurality of bulk grains formed by the particles 50a. The particles 50a may have a substantially spherical or ellipsoidal shape. Other structures are nevertheless possible for the granular filtration layer. According to the variant of FIG. 4, the filtration layer 15a further comprises reinforcing fibers 52a, here in the form of discontinuous fibers, present in the interstices between the particles 50a. The volume fraction of the fibers 52a in the layer 15a can be substantially equal to the volume ratio of fibers desired in the texture 6 densified by the matrix. The discontinuous fibers 52a may be short fibers having in particular an average size less than or equal to 30000 μm or alternatively be in the form of independent filaments. According to a variant, the reinforcing fibers can be bound together so as to form a textile such as a fabric or a non-woven. The fibers added to the filtration layer are of course formed of a material compatible with an integration of the composite material part. In a particular case, the fibers 52a can be formed of the same material as the particles 50a, and possibly as the matrix particles PM. According to the variant of FIG. 5, the filtration layer 25a is in the form of a block comprising the particles 50a bound together by a fugitive binder 54a, which is intended to be eliminated during the method. The elimination of the binder 54a allows to release the pores between the particles 50a and thus to discharge the liquid medium ML from the suspension. It is for example possible to choose a binder 54a soluble in the liquid medium ML or alternatively a binder 54a which can be thermally removed. It is of course possible to add fibers 52a to the binder 54a and to the particles 50a as in the case of FIG. 4. When placing the elements in the mold, the layer 5a can be deposited then the texture 6 can be positioned and the mold closed. This deposition can be done by manual placement or, alternatively, by spraying the particles 50a on the layer 5b and/or on the surface SD.

The case of FIGS. 6A and 6B relates to a variant where the retention element comprises additional filtration particles 25b distinct from the particles 50a forming the layer 5a. In this case, the layer 5b of adjusted pores may or may not be added to allow the retention of the particles which was mentioned above. FIG. 6A shows the granular filtration layer formed by the particles 50a which can be produced by deposition as described above. Alternatively, it is possible to first position the texture 6 in the mold and then carry out an infiltration of the particles 50a by means of a carrier liquid supplied from the side of the surface SD. In the example of FIG. 1, this infiltration can be carried out through the lower portion of the mold through the molding surface 4. The particles 50a are chosen with a particle size greater than a size of the interstices of the pore network of the texture 6 so as not to pass therethrough and to be retained facing the surface SD. Particles 50a of substantially spherical shape have been shown but one does not depart from the scope of the invention when these particles 50a have a different shape, for example when they are of substantially polyhedral shape so as to interlock with each other, and make their movement difficult once piled up or compacted and "percolated". It is then possible to proceed with the supply of the particles 25b also by infiltration with a carrier liquid which may be identical or different from the carrier liquid used to supply the particles 50a. The movement of the particles 25b towards the texture 6 is hindered by the particles 50a and some of the particles 25b are housed in the interstices existing between the particles 50a. In the example illustrated, the particles 25b have a finer particle size than the particles 50a, preferably between 2 and 20 times smaller in order to be interlocked into the interstices of the particles 50a. Preferably at least a portion of the particles 25b has a polyhedral shape so as to be interlocked with each other and get stuck between the particles 50a. In the example illustrated, the particles 25b have a shape different from that of the particles 50a but one does not depart from the scope of the invention when this is not the case. Thus a set of particles 50a and 25b interlocked with each other is obtained, resulting in a blocking of the whole. This interlocking prevents the movement of the particles 50a towards the molding surface 4 during the discharge of the liquid medium ML. According to an example, for a texture 6 whose filaments have a diameter comprised between 10 µm and 20 µm and interfilament spaces comprised between 1 µm and 5 µm, and interfiber spaces which can reach 50 µm, particles 50a with a particle size comprised between 5 µm and 50 µm and particles 25b with a particle size comprised between 0.2 µm and 5 µm can be used. A case where the addition of particles 25b is carried out by infiltration was described but one does not depart from the scope of the invention if the particles 50a and 25b are co-deposited by spraying or already bound by a fugitive binder in a manner similar to what was described above. In the example of FIG. 6B, all the particles 50a and 25b are interposed between the texture 6 and the molding surface 4. The case of two sets of particles 50a and 25b of distinct particle size was shown but one does not depart from the scope of the invention if more particle sizes are used with an average size of filtration particles which is generally decreasing when moving from the texture 6 towards the molding surface 4. By way of example, use can be made of a first set of filtration particles, located in a first region on the side of the surface SD, having a first average size comprised between 0.5 times and 3.5 times the diameter of the filaments of the texture 6, preferably between 0.5 times and 1.5 times this diameter, a second set of filtration particles, located at least partly in a second region between the first region and the molding surface 4, having a second average size comprised between 0.1 times and 1 time the diameter of the filaments of the texture 6, and a third set of filtration particles, located at least partly in a third region between the second region and the molding surface 4, having a third average size comprised between 0.03 times and 0.8 times the diameter of the filaments of the texture 6. In this example, the first, second and third sets of filtration particles are interlocked with each other and the third average size is less than the second average size which is in turn less than the first average size.

Once all the elements are positioned in the mold, the matrix particles PM are introduced into the pores of the texture 6, as illustrated in FIG. 1. These particles PM are introduced into the texture 6 by implementing techniques known per se. The suspension 1 comprising the matrix particles PM in a liquid medium ML is initially stored in a container C1 located outside the mold. The liquid medium ML can be aqueous or alcoholic. The average size of matrix particles PM can be comprised between 0.1 µm and 2 µm. The particles PM can be made of ceramic, or carbon or carbon precursor. The volume content of particles PM in the suspension 1 can, before introduction into texture 6, be comprised between 5% and 50%. The container C1 is connected to the mold via a conduit 80 which opens at a port 8a located upstream of the texture 6. In the text, the expressions "upstream" and "downstream" mean, unless otherwise stated, in relation to the direction of flow of the liquid medium ML of the suspension 1. A pump 82 is present on the conduit 80 and allows the flow of the suspension 1 from the container C1 towards the port 8a in order to allow its introduction into the mold. Alternatively to a pump 82, it is possible to use a device for pressurizing the suspension 1 in C1 with respect to the tool to produce the flow of the suspension 1. The flow of the suspension 1 upstream of the texture 6 is indicated by the arrows E1 in FIG. 1. A distributor 7, for example in the shape of a grid, allows to uniformly distribute the suspension 1 on a surface SI for introducing the texture 6 opposite to the surface SD. The use of such a distributor 7 is optional. The suspension 1 flows into the texture 6 through the surface SI and the layer 5a retains the matrix particles PM in the pores of the texture 6 and the liquid medium ML is drained through the surface SD, the layers 5a and 5b as well as the permeable molding surface 4 to be discharged outside the mold. The texture 6 is present between the port 8a and the port 2a along the flow path of the liquid medium ML. The layer 5a is present between the texture 6 and the port 2a along the flow path of the liquid medium ML. The layer 5b is present between the layer 5a and the port 2a along the flow path of the liquid medium ML. The liquid medium ML then flows through the cavity 3 defined by the molding surface 4 towards the port 2a located downstream of the texture and connected via a conduit 20 to a container C2, distinct from the container C1, and located outside the mold (flow arrows EML). The liquid medium ML is collected in the container C2. A texture 6 loaded with matrix particles PM is thus obtained. The texture 6 can be maintained in compression in the mold during the introduction of the matrix particles PM. Such compression can promote drainage of the liquid medium ML and allows to achieve a target thickness for the fibrous preform.

The method is continued by the formation of the matrix from a heat treatment of this texture 6 loaded with particles PM and filtration particles 50*a*. According to the example in FIG. 2, the matrix particles PM and the particles 50*a* are sintered in order to obtain the part 100 made of composite material. This part 100 comprises a substrate 102 whose reinforcement is formed by the texture 6 and densified by the matrix obtained from the matrix particles PM and a surface layer 104 formed from the particles 50*a*, here obtained by sintering these particles 50*a*. The part 100 comprising the substrate 102 and this surface layer 104 is then demolded and then assembled, for example in an aeronautical turbomachine. As an example of parts 100, mention can be made of an aeronautical engine ejection part, such as a nozzle ("exhaust nozzle") or an ejection plug, or an aft aerodynamic fairing ("APF" for "Aft Pylon Fairing"). It will be recognized that other methods are possible for the production of the matrix and the surface layer. According to a variant, it is possible to use matrix particles PM and particles 50*a* made of carbon or silicon carbide and carry out an infiltration with molten silicon in order to obtain a ceramic matrix and a SiC or Si—SiC surface layer.

An introduction of the suspension 1 through the upper portion of the texture 6 have just been described, in connection with FIG. 1. The example of FIG. 3 is a variant showing the possibility of introducing the suspension 1 through the lower portion of the texture 6 and of carrying out the drainage and discharge of the liquid medium through its upper portion. The references of the elements having the same function as in FIG. 1 are included in this figure. In the case of FIG. 3, it is possible to first position the texture 6 on the molding surface 4 then position the granular filtration layer 5*a* then the retention layer 5*b* and then close the mold. The discharge of the liquid medium ML takes place here through a permeable surface 41 in the upper portion of the mold and in communication with the port 8*a*.

The expression "comprised between . . . and . . . " must be understood as including the limits.

The invention claimed is:

1. A method for producing a part made of composite material, comprising:
    obtaining a mold comprising (i) a fibrous texture, (ii) a granular filtration layer located between a drainage surface of the fibrous texture and a permeable discharge element and comprising a powder of filtration particles, and (iii) a retention element for retaining the granular filtration layer, which retention element is distinct from said granular filtration layer and located between the permeable discharge element and the drainage surface,
    introducing a suspension comprising matrix particles in a liquid medium through an introduction surface of the fibrous texture that is distinct from the drainage surface, the liquid medium passing through the drainage surface, the granular filtration layer and the retention element to be discharged through the permeable discharge element, and the matrix particles being retained in the pores of the fibrous texture by the granular filtration layer, and
    after discharging the liquid medium, forming the part made of composite material by forming a matrix in the pores of the fibrous texture loaded with the thus introduced matrix particles, the matrix being formed from the matrix particles and forming a surface layer of this part from the filtration particles,
    wherein obtaining the mold comprises positioning the granular filtration layer in the form of a block comprising the filtration particles bound together by a fugitive binder.

2. The method according to claim 1, wherein the granular filtration layer further comprises reinforcing fibers distinct from the filtration particles.

3. The method according to claim 1, wherein the retention element comprises at least one film or textile having a plurality of orifices for discharging the liquid medium and located between the granular filtration layer and the permeable discharge element.

4. The method according to claim 1, wherein the retention element comprises at least one granular assembly formed by additional filtration particles having a different average size and/or a different shape of the filtration particles and interlocked therewith so as to prevent their movement towards the permeable discharge element.

5. The method according to claim 1, wherein obtaining the mold comprises spraying the filtration particles onto the drainage surface of the fibrous texture and/or onto the permeable discharge element.

6. The method according to claim 4, wherein obtaining the mold comprises (a) the formation of the granular filtration layer comprising the filtration particles, and (b) the supply of additional filtration particles in a carrier liquid which is drained through the filtration particles and the drainage surface, the additional filtration particles being retained by the filtration particles so as to form the retention element.

7. The method according to claim 6, wherein the granular filtration layer is formed by adding filtration particles to a second vector liquid on the side of the drainage surface, said filtration particles having a particle size greater than a size of the interstices of the pore network of the fibrous texture, with drainage of the second carrier liquid through the drainage surface, the filtration particles being retained by the fibrous texture so as to form the granular filtration layer.

8. The method according to claim 1, wherein the matrix is formed by sintering the matrix particles, and the surface layer is formed by sintering the filtration particles.

9. The method according to claim 1, wherein the matrix particles and the filtration particles are formed from the same material.

10. The method according to claim 1, wherein the matrix particles and the filtration particles are made of oxide ceramic material, silicon carbide or carbon.

11. The method according to claim 1, wherein the part is a turbomachine part.

* * * * *